United States Patent [19]

Okubo

[11] 4,159,422
[45] Jun. 26, 1979

[54] TEMPERATURE STABLE DISPLACEMENT SENSOR WITH FINE RESOLUTION

[76] Inventor: Shigeo Okubo, 350 Sharon Park Dr., #E24, Menlo Park, Calif. 94025

[21] Appl. No.: 845,530

[22] Filed: Oct. 26, 1977

[51] Int. Cl.² .............................................. G01D 5/34
[52] U.S. Cl. .................................. 250/231 R; 33/366
[58] Field of Search ........................ 33/366; 250/231 R

[56] References Cited

U.S. PATENT DOCUMENTS

| 3,011,384 | 12/1961 | Biber .................................. 33/366 X |
| 3,789,510 | 2/1974 | Richter, Jr. et al. ............... 33/366 X |

*Primary Examiner*—Lawrence J. Dahl
*Attorney, Agent, or Firm*—Townsend and Townsend

[57] ABSTRACT

A temperature stable displacement sensor with fine resolution having a housing with a radiation source, preferably an LED for generating radiation in the near-infrared region, a lens for collimating the LED radiation into a beam spaced along the axis of the housing from the LED by a distance equal to the focal length of the lens, a reflector for intercepting and reflecting the beam, the reflector comprising a first fluid having a relatively high reflection coefficient and a second fluid supported by the first having a substantially greater viscosity than the first fluid, and a radiation detector located adjacent the radiation source for receiving the reflected beam and generating an electrical signal representative of the angular position of the reflected radiation beam incident thereto with respect to a reference axis.

30 Claims, 4 Drawing Figures

TEMPERATURE STABLE DISPLACEMENT SENSOR WITH FINE RESOLUTION

BACKGROUND OF THE INVENTION

This invention relates to angular displacement sensor devices, such as level indicators, tilt indicators and accelerometers.

Sensors are known which are used for measuring the angular displacement of a reference planar surface from a reference axis. Such devices are used to measure the tilt of an object from vertical, the magnitude and direction of small vibrations, e.g. seismic vibrations, and the like. Some devices have employed electromagnetic radiation and photosensitive detectors for measuring the amount, or angle of, radiation reflected from a surface, such as a mirror, which maintains a fixed (e.g., horizontal) attitude when the sensor housing is angularly displaced with respect to a reference axis or plane. Other known devices have employed a fluid surface as the reflecting surface which provides the reference plane for measuring the angular displacement of the sensor housing, while still other known devices of this type have employed a transmittive fluid column whose length changes in a manner proportional to the degree of tilt of the sensor casing.

Known sensors of the above type suffer from several limitations. Some sensors provide a lower limit of resolution which is too large to provide meaningful data for small vibrations or angular displacements, such as seismic microvibrations. Others are sensitive to both linear accelerations and/or linear motion, as well as angular motion, which can be separated from the significant data, if at all, only by the use of complicated and expensive electronic circuits. Perhaps the most significant problem, however, with respect to prior art sensors of the above type is that of obtaining calibrated data over wide temperature variations. All mechanical, optical and electrical elements possess important characteristics which vary with the ambient temperature to which they are subjected. Mechanical elements, for example (and optical elements as well), all possess a finite coefficient of thermal expansion which affects translatory and rotary motion upon which sensors depend for accurate results. Similarly, electrical elements possess temperature dependent characteristics, such as temperature coefficient of resistance, temperature coefficient of conductance, and the dielectric constant which alter the absolute magnitude of output signals generated by electrical circuitry employing such elements. In general, the finer the lower limit of the resolution desired for a given sensor, the more expensive the cost of manufacturing a suitable sensor, which, in many cases, provides only marginal accuracy.

Efforts in the past to design sensors devoid of the above limitations have not met with success.

SUMMARY OF THE INVENTION

The invention comprises an angular displacement sensor which is extremely inexpensive to fabricate, rugged in construction, highly insensitive to temperature variations, insensitive to linear (as opposed to angular) motion, and which provides extremely fine resolution with a lower limit of about $1 \times 10^{-9}$ radian.

The invention comprises a housing with a first support means therein for mounting a radiation source means for generating electromagnetic radiation, the radiation source means preferably comprising a light-emitting diode which generates radiation in the near-infrared region of the spectrum; lens means, positioned in the housing a pre-determined distance from the radiation source means, for collimating electromagnetic radiation received from the source means into a beam; reflector means positioned in the housing for intercepting and reflecting the beam in the general direction of the support means; and radiation detector means positioned within the housing adjacent the radiation source means for receiving the beam reflected by the reflector means and for generating an electrical signal representative of the angular position of the reflected radiation beam incident thereto with respect to a reference axis.

The reflector means includes a sealed chamber and a fluid means confined in the chamber for providing a horizontal planar reference surface. The fluid means preferably comprises a first fluid having a relatively high reflection coefficient for radiation of the type generated by the radiation source means, and a second fluid supported by the first fluid and having a substantially greater viscosity than the first fluid, e.g. a viscosity index at least two orders of magnitude greater than the viscosity index of the first fluid. In a specific embodiment of the invention, the first fluid is mercury and the second fluid is silicone oil.

The radiation detector means preferably includes a pair of photocells carried by the support means and juxtaposed along a direction substantially normal to the reference axis, the photocells being thermally matched to provide substantially identical output signal characteristics with changes in environmental temperature.

The lens means preferably comprises a plano-convex lens fabricated from fused quartz and positioned between the radiation source means and the reflector means with the plano surface facing the former and the convex surface facing the latter, with the pre-determined separation distance between the lens means and the radiation source means being equal to the focal length of the plano-convex lens.

The reflector means further includes an optically flat disc which provides a fluid seal between the fluid means and the lens means.

The housing and support means are fabricated from materials having closely matched thermal expansion characteristics; in a specific embodiment of the invention, for example, both the housing and the support means are fabricated from stainless steel. The housing is preferably symmetric about the longitudinal axis thereof, e.g., a right circular cylinder, and is provided with end closure members also having closely matched thermal characteristics.

The reflector means is thermally isolated by virtue of the fact that the confined fluid means undergoes pure translatory motion in response to a change in volume with temperature, and also by virtue of the fact that the angular position of the reflected portion of the collimated beam which strikes the reflecting surface of the fluid means is completely independent of linear motion of the reflecting surface.

In use, the sensor is installed in the operating environment, e.g., in a borehole partially filled with sand as a support, is maneuvered to a level attitude and left in place. When the attitude of the sensor housing changes with respect to horizontal, the reflecting surface of the reflector means remains horizontal. As a result, the angle of beam incident to the reflecting surface, and the angular position of the reflected beam, both change and the beam spot moves along the surface of the paired photocells, which changes their electrical signal outputs in a pre-determined manner. By using paired photocells electrically coupled in a short-circuit configuration, a lower limit of $1 \times 10^{-9}$ radian can be achieved.

For a fuller understanding of the nature and the advantages of the invention, reference should be had to the ensuring detailed description taken in conjunction with the accompanying drawings.

DESCRIPTION OF THE PREFERRED EMBODIMENTS

Figure 1:
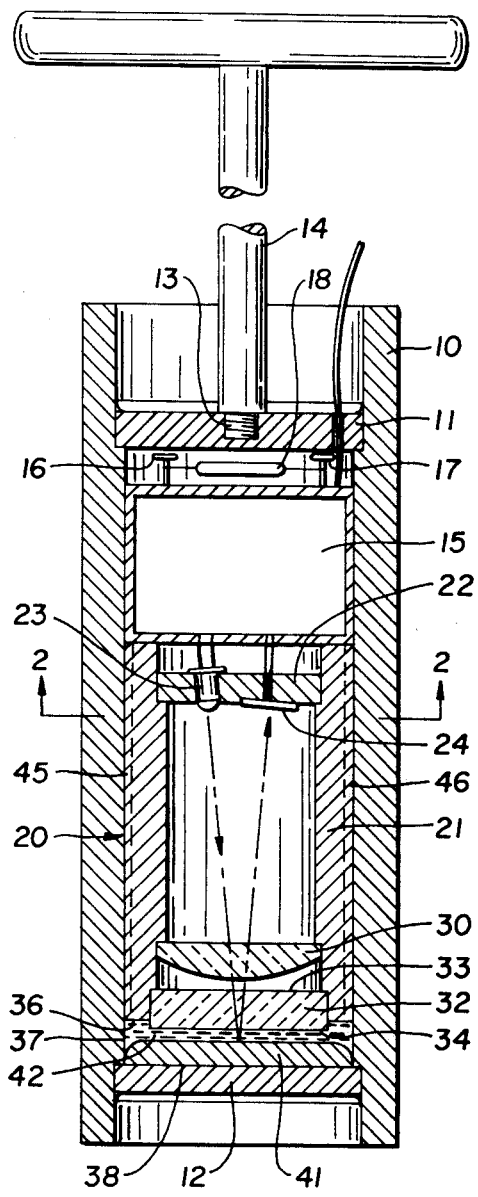
FIG. 1 is a longitudinal sectional view showing the preferred embodiment of the invention.
Figure 3:
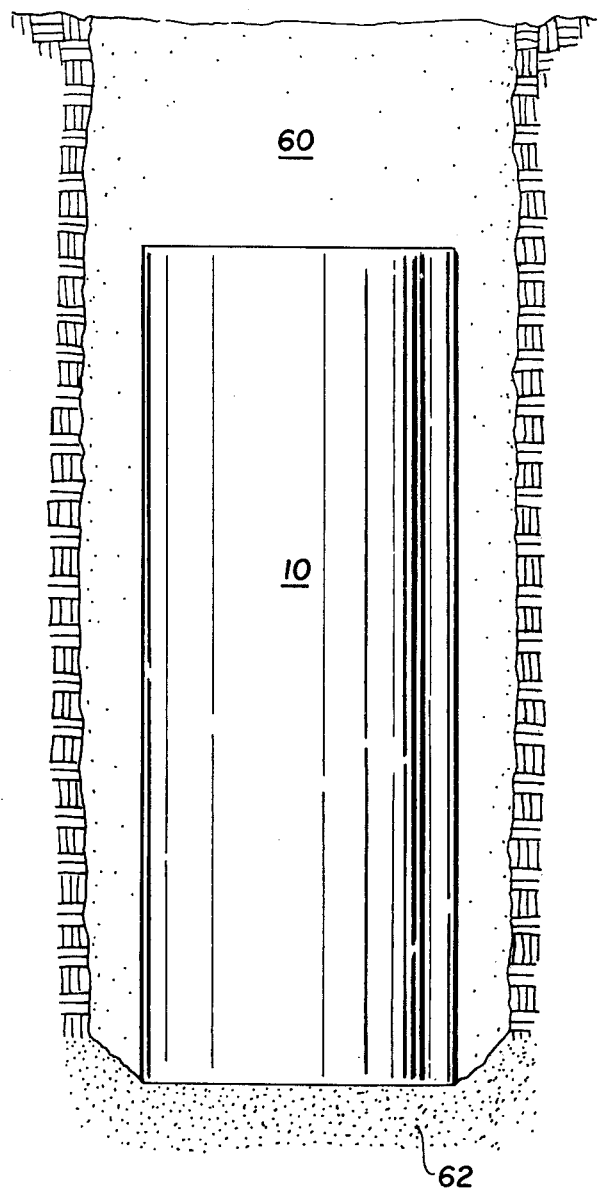
FIG. 3 is a schematic view showing the preferred embodiment in situ.

Turning now to the drawings, FIG. 1 is a longitudinal sectional view illustrating a preferred embodiment of the invention. As seen in this FIG., a tubular casing 10 having a cylindrical shape is provided with first and second end closure members 11, 12 for the purpose of sealing the hollow interior thereof. End closure member 11 is provided with a threaded bore 13 for receiving a removable handle 14 for facilitating installation and removal of the device from remotely accessible environmental locations, e.g. a borehole in the earth.

Figure 4:
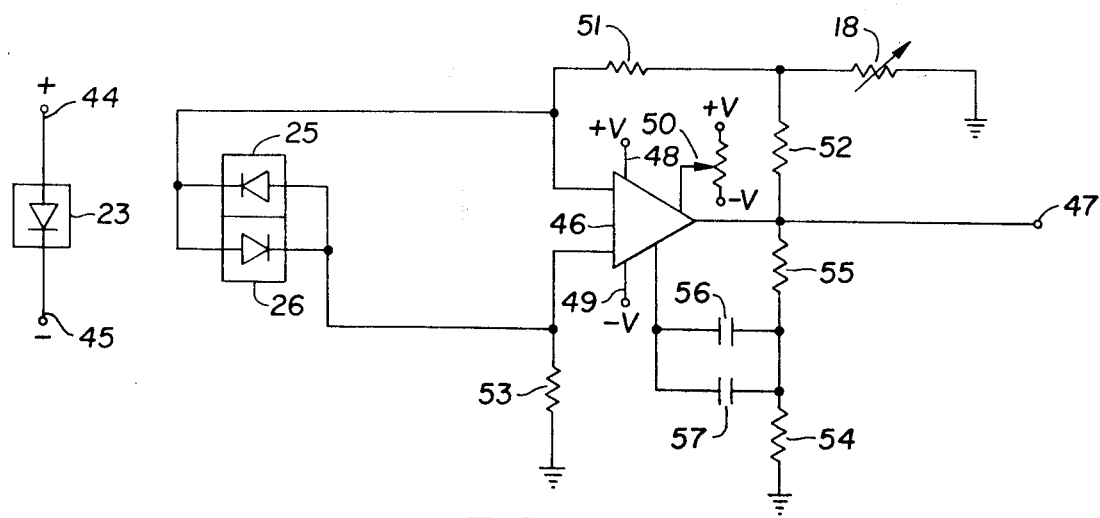
FIG. 4 is a schematic diagram of electronic circuitry incorporated in the preferred embodiment.

Disposed within the hollow interior of tubular casing 10 adjacent end closure member 11 is an enclosure 15 housing the electronic circuitry shown in FIG. 4. A pair of electrically conductive posts 16, 17 extend from the upper surface of enclosure 15 for providing mechanical and electrical connections for a scaling resistor 18, described below.

Figure 2:
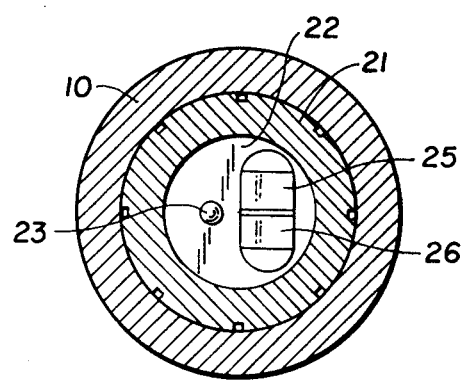
FIG. 2 is a sectional view taken along lines 2—2 of FIG. 1 and illustrating relative placement of the radiation source and detectors.

Mounted within the interior of tubular casing 10 in the region between enclosure 15 and end closure member 12 is an autocollimator generally designated by reference numeral 20 and including a longitudinally extending tubular support member 21. Supported at the upper end of tubular support member 21 is a transverse support member 22 which carries a radiation source 23, preferably a light-emitting diode, and a radiation detection means 24. As best shown in FIG. 2, radiation detection means 24 comprises a pair of photocells 25, 26 positioned in a juxtaposed relation along a line normal to the longitudinal axis of autocollimator 20 and tubular casing 10. Both the radiation source 23 and the photocells 25, 26 may be secured to transverse support member 24 in any suitable fashion, e.g., by using an adhesive material whose thermal characteristics (e.g., coefficient of thermal expansion and thermal conductivity) are closely matched to those of transverse support member 22.

Positioned below radiation source 23 and radiation detection means 24 is a collimating lens 30 preferably having a plano-convex shape and located a distance along the longitudinal axis of autocollimator 20 from source 23 and detecting means 24 which is equal to the focal length of lens 30.

Positioned immediately below collimating lens 30 is an optically flat polished disc 32 which is substantially transparent to radiation of the wavelength emitted by source 23. Disc 32 is arranged with the plane parallel faces 33, 34 thereof normal to the longitudinal axis of autocollimator 20. Both collimating lens 30 and disc 32 are preferably fabricated from fused quartz.

The bottom surface 34 of disc 32 forms a portion of a sealed chamber defined by the lower annular edge 36 of tubular support member 21, portion 37 of the lower inner wall surface of tubular casing 10 and upper surface 38 of end closure member 12. This chamber, generally designated by reference numeral 40, houses a first fluid 41 having a large reflection coefficient for radiation of a wave length emitted by source 23, and a second fluid 42 for providing viscous damping to the motion of the surface of first fluid 41. In the preferred embodiment, first fluid 41 comprises a pool of mercury, and second fluid 42 comprises a thin layer of high-viscosity oil which has a viscosity index at least two orders of magnitude greater than that of the mercury, such as silicone oil. In order to facilitate the filling of chamber 40, and also to provide a vent therefor, a pair of tubular conduits 45, 46 are provide in tubular support member 21 which extend longitudinally thereof from top to bottom. Tubes 45 and 46 may comprise longitudinal grooves formed in the outer wall of tubular support member 21.

The operation of the invention is as follows.

Radiation from source 23 enters lens 30 via the upper piano face and emerges via the lower convex face as a beam of collimated radiation. This beam passes through disc 32 and second fluid 42, and is reflected by the upper surface of first fluid 41. The reflected beam travels upwardly through the second fluid 42, disc 32, lens 30 and upwardly to the radiation detecting means 24 where it irradiates the photocells 25, 26. The irradiated photocells 25, 26 generate electrical output signals which are proportional to the total amount of radiation encountered by each of the cells 25, 26.

FIG. 4 illustrates the electrical circuitry housed in enclosure 15. As seen in this FIG., a first pair of terminals 44, 45 are coupled to the anode and cathode of light-emitting diode 23 to provide operating current thereto from a remote source (not shown). Photocells 25, 26 are shunt connected and differentially coupled to the input terminals of an operational amplifier 46. The output signal from amplifier 46 which appears on terminal 47 is an amplified version of the differential input to amplifier 46 and is coupled to remote electronic circuitry (not shown) which is used to drive a suitable indicator such as a volt meter, a strip chart recorder, or the like. In addition, the remote circuitry may include a constant current source coupled to terminals 44 and 45, as well as circuitry for providing operating voltages to terminals 48, 49 of operational amplifier 46. Further, the remote circuitry includes self-calibration circuits, a temperature monitor such as a thermistor, and an active low pass filter for the purpose described below. Since such electronic circuitry is conventional, further description thereof is omitted in the interested of avoiding prolixity.

Operational amplifier 46 is preferably a wide-band high-gain operational amplifier especially adapted for low level instrumentation applications where accurate closed-loop gain and offset null capabilities are required. A type 725 integrated circuit operational amplifier is suitable for such applications. Resistors 51, 52, 18 and 53 are coupled to the input terminals and output terminal of the operational amplifier 46 in a conventional manner to provide an output voltage signal at terminal 47 suitable for utilization by the remote circuitry. Resistors 54 and 55 and capacitors 56 and 57 are coupled in a suitable manner to provide frequency compensation for the amplifier 46. The scale factor provided by the electrical circuitry may be varied by adjusting the value of scaling resistor 18. Alternatively, scaling resistor 18 may be a fixed resistance and the scale factor may be changed by physically removing one resistor 18 of a first value and substituting another resistor 18 of a different value. In addition, the scale factor may be varied by preselecting values for resistors 18 and 52 which determine the feedback resistance for amplifier 46.

Calibration and null adjustment of the preferred embodiment may be accomplished in the manner described in detail in my co-pending U.S. patent application Ser. No. 864,427 filed Dec. 27, 1977 for "Flexural Rigidity Sensor," the disclosure of which is hereby incorporated by reference.

In use, the sensor is placed on a supporting object or medium whose motion is to be monitored, such as by placing the sensor in a borehole 60 formed in the surface of the earth. To facilitate null adjustment, the borehole is preferably partially filled with sand 62 which has been tamped to provide an approximately level surface. The sensor is next physically maneuvered to provide an approximate null using the insertion handle noted above, after which the device is null adjusted using the techniques described in the above-referenced co-pending patent application. With the device null adjusted, any angular motion of the housing 10 in a vertical plane normal to the page of the sheet containing FIG. 2 will result in corresponding motion of the radiation beam spot along the surfaces of photocells 25, 26. Movement of the radiation beam spot results from the fact that the reflecting upper surface of the first fluid 41 maintains a horizontal planar attitude whenever the mechanical sensor components undergo such angular deviation. This changes the angle of incidence of the radiation from source 23 on the reflecting upper surface of first fluid 41, and thus the angle of reflection. Motion of the radiation beam spot along the surface of photocells 25, 26 results in each cell receiving a different amount of total radiation, and thus produces a corresponding change in the magnitude of the output signal present on terminal 47. By properly calibrating the circuitry, and knowing the scale factor provided by resistors 18 and 52, the output signal on terminal 47 provides sufficient information to enable accurate measurement of the amount of angular deviation of the sensor.

Sensors constructed according to the invention embody several features which reduce the temperature sensitivity of such sensors to a level hitherto unobtainable with known prior art devices and which permit a lower level of resolution of angular displacement of $1 \times 10^{-9}$ radian. Optically, the highly viscous damping fluid 42 dampens undesirable high-frequency disturbances of the reflecting surface of first fluid 41. In order to minimize the effect of change of index of refraction with temperature of the damping fluid 42, the thickness of fluid 42 is maintained very low, on the order of 2 mm. Chamber 40 is carefully filled first with fluid 41 and then with fluid 42 to avoid entrapment of any air bubbles in the chamber in order to eliminate any air-fluid interface in the optical path of the radiation beam from source 23. In addition, by confining fluids 41, 42 in a chamber whose upper surface is the optically flat lower surface 34 of disc 32, the optical surfaces through which the radiation beam pass have zero curvature, so that the sensor behaves optically like a simple pendulum of infinite length, or zero natural frequency. As a result, the device is a pure angular displacement sensor with a sensitivity of 1, independent of damping. This feature eliminates the temperature sensitivity characteristics associated with damping, unlike most sensors whose dynamic range encompasses their natural frequencies and which are thus very sensitive to temperature effects of damping. Additionally, since the radiation incident on the reflecting surface of first fluid 41 is collimated, the location of the radiation beam spot on photocells 25, 26 is only affected by angular motions on the reflecting surface of first fluid 41 and is independent of linear motions thereon. This removes a very large source of temperature-induced errors found in most prior art devices.

While the reflecting surface of first fluid 41 does respond to linear accelerations, these accelerations are typically caused by microseisms of 0.1 to 10.0 hertz, which can be filtered electronically by the low pass filter in the remote circuitry noted supra.

Since both the LED radiation source 23 and photocells 25, 26 have electro-optical characteristics which vary with temperature, transverse support member 22 is fabricated from a material having a high coefficient of thermal conductivity to ensure temperature stabilization in situ. In addition, tubular support member 21 and tubular casing 10 are both fabricated from materials having thermal conductivities which are closely matched to that of transverse support member 22. Preferably, elements 10, 11, 12, 21 and 22 are all fabricated from stainless steel which has excellent thermal characteristics and in addition is non-corrosive.

To maximize optical sensitivity, the wave length of the radiation emitted by source 23 should match the peak responsivity of the radiation detection means 24. In the preferred embodiment, source 23 comprises a light-emitting diode which emits infrared light principally in the 9000 Å. wave length region, which matches the peak responsivity of the photocells 25, 26 employed. In addition, thermal stability of the invention is enhanced by the use of fused quartz in the fabrication of lens 30 and optical disc 32, since this material possesses a very low coefficient of thermal expansion, and also a very low coefficient of thermal conductivity. This latter feature ensures that, once thermal equilibrium has been reached within the device, slight changes in the internal temperatures of the device will have a minimal effect on that portion of the optical path defined by lens 30 and disc 32.

To further reduce the thermal sensitivity of sensors fabricated according to the invention, photocells 25, 26 are thermally matched by testing each individual photocell and obtaining characteristic curves of output current vs. temperature and intensity of received radiation. One method to obtain such plots is to attach a single photocell and light-emitting diode to transfer support member 22, insert this assembly into a Dewar flask, and vary the LED excitation current while measuring the output current of the photocell. In addition, the ambient and photocell temperatures should also be monitored continuously, and variation of the photocell output current at constant temperature with time should also be plotted. After several such photocells have been independently tested in this manner, the individual characteristic curves are then compared and photocells providing the best match are selected for paired used in a given sensor.

Further improved results can be obtained by subjecting each cell to several hours of thermal passivation, prior to the testing and selection process.

As will now be apparent, sensors fabricated according to the invention are very simple and rugged in construction and possess axial symmetry. In addition, the seismic element, viz., the first fluid 41, is completely isolated from thermal effects. In addition, the thermal matching of all components substantially reduces the thermal sensitivity of the sensor from that encountered in prior art devices.

The invention may be used as both a tilt sensor and also as a linear accelerometer capable of detecting steady-state accelerations down to a minimum of $1 \times 10^{-9}$ g. This latter capability is due to the fact that the linear acceleration sensitivity can be expressed as follows:

$$\tan \alpha = a_x/g$$

where alpha is tilt of the surface of first fluid 41, $a_x$ is linear acceleration and g is the acceleration due to gravity. For small angles:

$$\alpha = a_x/g$$

and $a_x$ can be determined directly from the measurement of $\alpha$.

While the above provides a full and complete disclosure of the preferred embodiments of the invention, various modifications, alternate constructions and equivalents may be employed without departing from the true spirit and the scope of the invention. For example, an additional pair of photocells 25, 26 may be juxtaposed along a line at right angles to the photocell pair 25, 26 described above and used to measure angular displacement of the sensor along an additional orthogonal direction. Therefore the above description and illustrations should not be construed as limiting the scope of the invention which is defined by the appended claims.

What is claimed is:

1. An apparatus for sensing angular displacement of an object from a reference axis, said apparatus comprising:
   a housing;
   support means positioned in said housing;
   radiation source means coupled to said support means for generating electromagnetic radiation;
   lens means positioned in said housing a pre-determined distance from said radiation source means for collimating electromagnetic radiation received from said source into a beam;
   reflector means positioned in said housing for intercepting and reflecting said beam in the general direction of said support means, said reflector means including means defining a sealed chamber and a fluid means confined in said chamber providing a horizontal planar reference beam reflection surface; and
   radiation detector means positioned within said housing adjacent said radiation source means for receiving the beam reflected by said reflector means, said radiation detector means including means for generating an electrical signal representative of the angular position with respect to said reference axis of the reflected radiation beam incident thereto.

2. The combination of claim 1 wherein said radiation source means comprises a light-emitting diode.

3. The combination of claim 2 wherein the wave length of said radiation from said light-emitting diode lies in the near infrared range.

4. The combination of claim 3 wherein said wave length is substantially 9000 Å.

5. The combination of claim 1 wherein said radiation detector means is carried by said first support means.

6. The combination of claim 1 wherein said lens means comprises a plano-convex lens and said predetermined distance is the focal length of said plano-convex lens.

7. The combination of claim 6 wherein said plano-convex lens is fabricated from fused quartz.

8. The combination of claim 1 wherein said reflector means includes an optically flat disc partially defining said sealed chamber and substantially transparent to said radiation, said disc providing a fluid seal between said fluid means and said lens means.

9. The combination of claim 1 wherein said fluid means comprises a first fluid, and a second fluid supported by said first fluid and having a substantially greater viscosity than said first fluid.

10. The combination of claim 9 wherein said first fluid is mercury.

11. The combination of claim 10 wherein said second fluid is silicone oil.

12. The combination of claim 9 wherein the viscosity index of said second fluid is at least two orders of magnitude greater than the viscosity index of said first fluid.

13. The combination of claim 1 wherein said radiation detector means comprises a pair of photocells juxtaposed along a direction substantially normal to said reference axis.

14. The combination of claim 13 wherein said photocells are thermally matched to provide substantially identical output signal characteristics with environmental temperature variations.

15. The combination of claim 1 wherein said housing and said support means are fabricated from materials having closely matched thermal characteristics.

16. The combination of claim 15 wherein said housing and said support means are fabricated from stainless steel.

17. An angular displacement sensing device for providing electrical signals representative of the angular displacement of a supporting medium from a reference axis, said device comprising:
   a housing having a hollow interior defining an internal chamber and first and second end portions;
   first and second closure means coupled to said first and second end portions; and
   autocollimator means positioned in said chamber between said first and second closure means, said autocollimator means including longitudinal support means having a hollow interior defining an inner chamber having a longitudinal axis and first and second end portions, transverse support means located adjacent said first end portion of said longitudinal support means, radiation source means carried by said transverse support member for generating electromagnetic radiation, lens means positioned along said longitudinal axis in the direction of said second end portion of said longitudinal support means by a predetermined distance from said radiation source means for collimating electromagnetic radiation received from said source means into a beam, reflector means positioned adjacent said second end portion of said longitudinal support means for intercepting and reflecting said beam towards said transverse support means, said reflector means including a sealed chamber and a fluid means confined in said chamber for providing a horizontal planar reference beam reflection surface, and radiation detector means carried by said transverse support means for receiving the beam reflected by said reflector means, said radiation detector means including means for generating an electrical signal representative of the angular position with respect to said reference axis of the reflected radiation beam incident thereto.

18. The combination of claim 17 wherein said radiation source means comprises a light-emitting diode.

19. The combination of claim 18 wherein the wave length of said radiation from said light-emitting diode lies in the near infrared range.

20. The combination of claim 17 wherein said lens means comprises a plano-convex lens and said predetermined distance is the focal length of said plano-convex lens.

21. The combination of claim 20 wherein said plano-convex lens is fabricated from fused quartz.

22. The combination of claim 17 wherein said reflector means includes an optically flat disc positioned in said inner chamber between said reflector means and said lens means and substantially transparent to said radiation, said disc providing a fluid seal between said fluid means and said lens means.

23. The combination of claim 17 wherein said fluid means comprises a first fluid, and a second fluid supported by said first fluid and having a substantially greater viscosity than said first fluid.

24. The combination of claims 23 wherein said first fluid is mercury.

25. The combination of claim 24 wherein said second fluid is silicone oil.

26. The combination of claim 23 wherein the viscosity index of said second fluid is at least two orders of magnitude greater than the viscosity index of said first fluid.

27. The combination of claim 17 wherein said housing and said longitudinal support means are both symmetric about said longitudinal axis.

28. The combination of claim 27 wherein the symmetricity of said housing and said longitudinal support means is right circular cylindrical.

29. The combination of claim 17 wherein said housing, said first and second closure means, said longitudinal support means and said transverse support means are all fabricated from materials having closely matched thermal characteristics.

30. The combination of claim 29 wherein said housing, said first and second closure means, said longitudinal support means and said transverse support means are all fabricated from stainless steel.

* * * * *